United States Patent
Troyer et al.

(10) Patent No.: US 12,488,264 B2
(45) Date of Patent: *Dec. 2, 2025

(54) ACCELERATOR FOR COMPUTING COMBINATORIAL COST FUNCTION

(71) Applicant: Microsoft Technology Licensing, LLC, Redmond, WA (US)

(72) Inventors: Matthias Troyer, Clyde Hill, WA (US); Helmut Gottfried Katzgraber, Kirkland, WA (US); Christopher Anand Pattison, College Station, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/586,535

(22) Filed: Feb. 25, 2024

(65) Prior Publication Data

US 2024/0202558 A1 Jun. 20, 2024

Related U.S. Application Data

(63) Continuation of application No. 18/157,339, filed on Jan. 20, 2023, now Pat. No. 11,922,337, which is a
(Continued)

(51) Int. Cl.
*G06N 7/01* (2023.01)
*G06F 7/58* (2006.01)
(Continued)

(52) U.S. Cl.
CPC .............. *G06N 7/01* (2023.01); *G06F 7/582* (2013.01); *G06F 9/3877* (2013.01); *G06F 17/11* (2013.01)

(58) Field of Classification Search
CPC ....... G06N 7/005; G06F 7/582; G06F 9/3877; G06F 17/11
See application file for complete search history.

(56) References Cited

U.S. PATENT DOCUMENTS

2020/0027016 A1* 1/2020 Rouhani .................. G06N 7/01

OTHER PUBLICATIONS

Bojnordi MN, Ipek E. Memristive boltzmann machine: A hardware accelerator for combinatorial optimization and deep learning. In2016 IEEE International Symposium on High Performance Computer Architecture (HPCA) Mar. 12, 2016 (pp. 1-13). IEEE. (Year: 2016).*

(Continued)

*Primary Examiner* — Chuen-Meei Gan
(74) *Attorney, Agent, or Firm* — Alleman Hall & Tuttle LLP

(57) ABSTRACT

A computing device, including memory, an accelerator device, and a processor. The processor may generate a plurality of data packs that each indicate an update to a variable of one or more variables of a combinatorial cost function. The processor may transmit the plurality of data packs to the accelerator device. The accelerator device may, for each data pack, retrieve a variable value of the variable indicated by the data pack and generate an updated variable value. The accelerator device may generate an updated cost function value based on the updated variable value. The accelerator device may be further configured to determine a transition probability using a Monte Carlo algorithm and may store the updated variable value and the updated cost function value with the transition probability. The accelerator device may output a final updated cost function value to the processor.

20 Claims, 8 Drawing Sheets

Related U.S. Application Data continuation of application No. 16/272,851, filed on Feb. 11, 2019, now Pat. No. 11,562,273.

(51) Int. Cl.
*G06F 9/38* (2018.01)
*G06F 17/11* (2006.01)

(56) References Cited

OTHER PUBLICATIONS

Communication under Rule 71(3) Received in European Patent Application No. 20708824.6, mailed on Jul. 16, 2024, 08 pages.

* cited by examiner

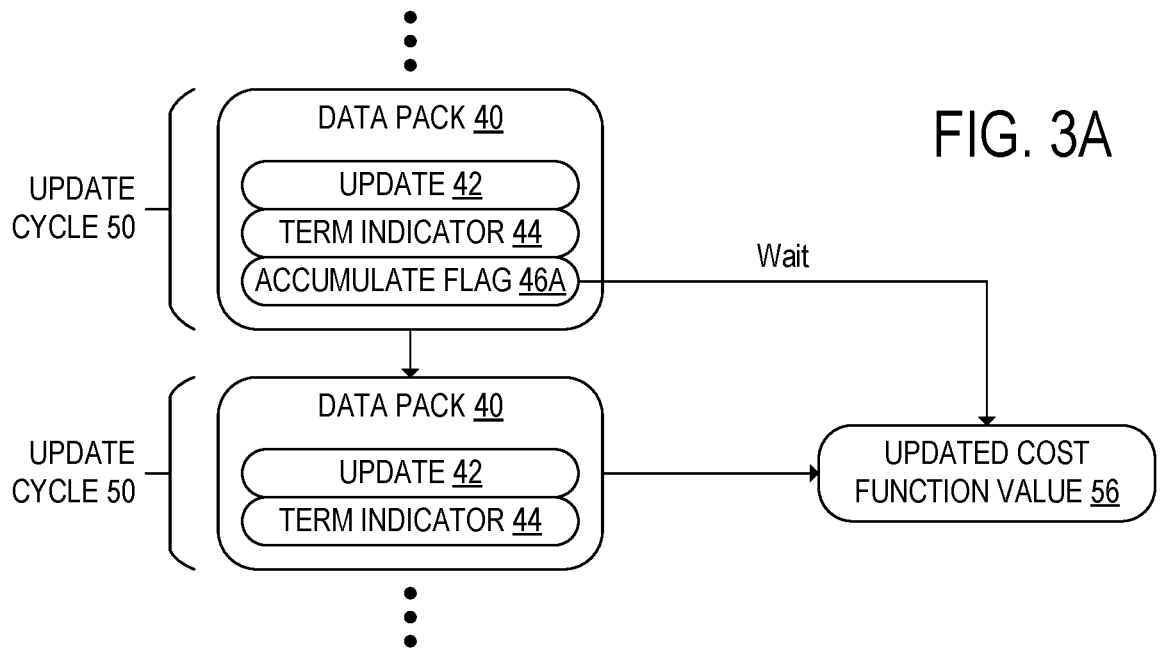
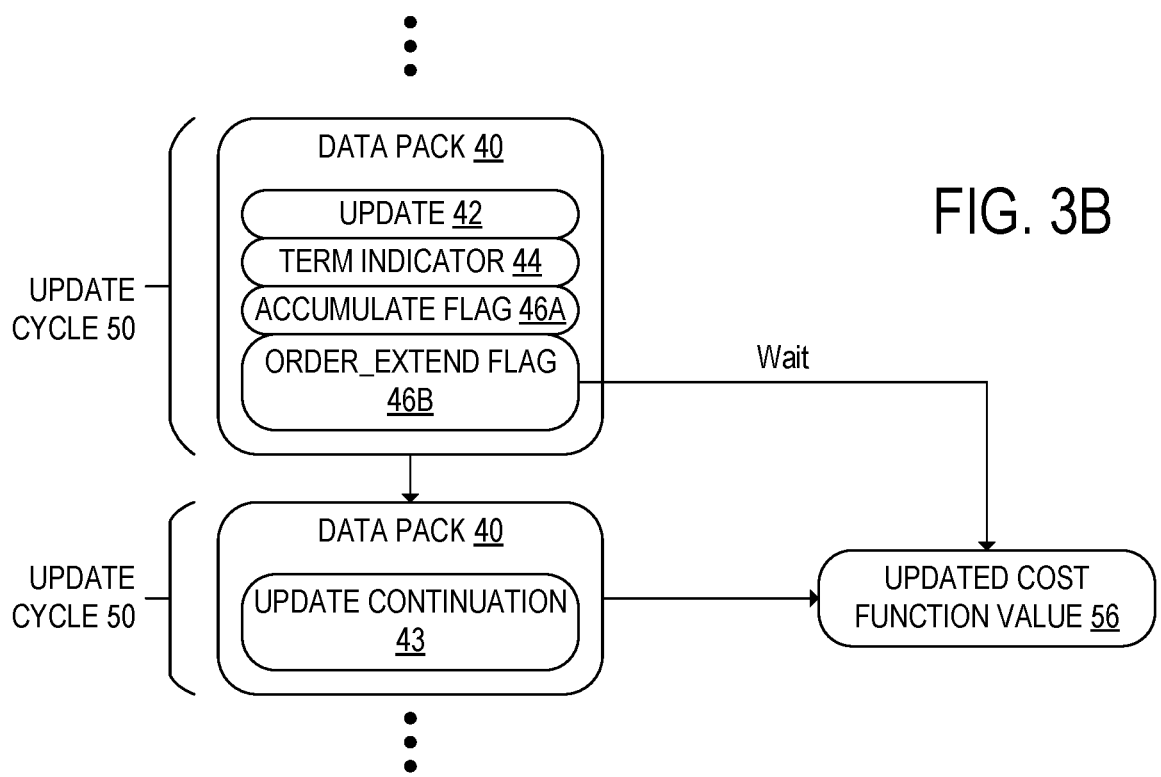

ACCELERATOR FOR COMPUTING COMBINATORIAL COST FUNCTION

CROSS REFERENCE TO RELATED APPLICATIONS

This application is a continuation of U.S. patent application Ser. No. 18/157,339, filed Jan. 20, 2023, which is a continuation of U.S. patent application Ser. No. 16/272,851, filed Feb. 11, 2019, now granted as U.S. Pat. No. 11,562,273, the entirety of each of which is hereby incorporated herein by reference for all purposes.

BACKGROUND

A combinatorial cost function is a scalar-valued function of one or more discrete or continuous variables. For example, a combinatorial cost function may be a sum of weighted terms that each depend on one or more variables. In a wide variety of applications, such as logistics, machine learning, and material design, it is useful to maximize or minimize a combinatorial cost function. Determining the maximum or minimum of a combinatorial cost function is frequently an NP-hard problem for which it would not be feasible to find an exact solution. Instead, solutions to combinatorial cost functions are more frequently approximated by numerical methods. However, these numerical methods are often slow and/or low-precision. Thus, solving for approximate maxima and minima of computational cost functions may be computing-intensive and costly.

SUMMARY

According to one aspect of the present disclosure, a computing device is provided, including memory storing instructions to compute a combinatorial cost function of a plurality of variables. The computing device may further include an accelerator device and a processor. The processor may be configured to generate a plurality of data packs. Each data pack may indicate an update to a variable of the one or more variables. The processor may be further configured to transmit the plurality of data packs to the accelerator device. The accelerator device may be configured to, for each data pack, retrieve a variable value of the variable indicated by the data pack. The accelerator device may be further configured to generate an updated variable value of the variable as indicated by the data pack. The accelerator device may be further configured to generate an updated cost function value of the combinatorial cost function based on the updated variable value. The accelerator device may be further configured to determine a transition probability using a Monte Carlo algorithm. The accelerator device may be further configured to store the updated variable value and the updated cost function value with the transition probability. The accelerator device may be further configured to output a final updated cost function value of the combinatorial cost function to the processor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3A shows a data pack including an Accumulate flag, according to the embodiment of FIG. 1.

FIG. 3B shows a data pack including an Order_Extend flag, according to the embodiment of FIG. 1.

DETAILED DESCRIPTION

Figure 1:
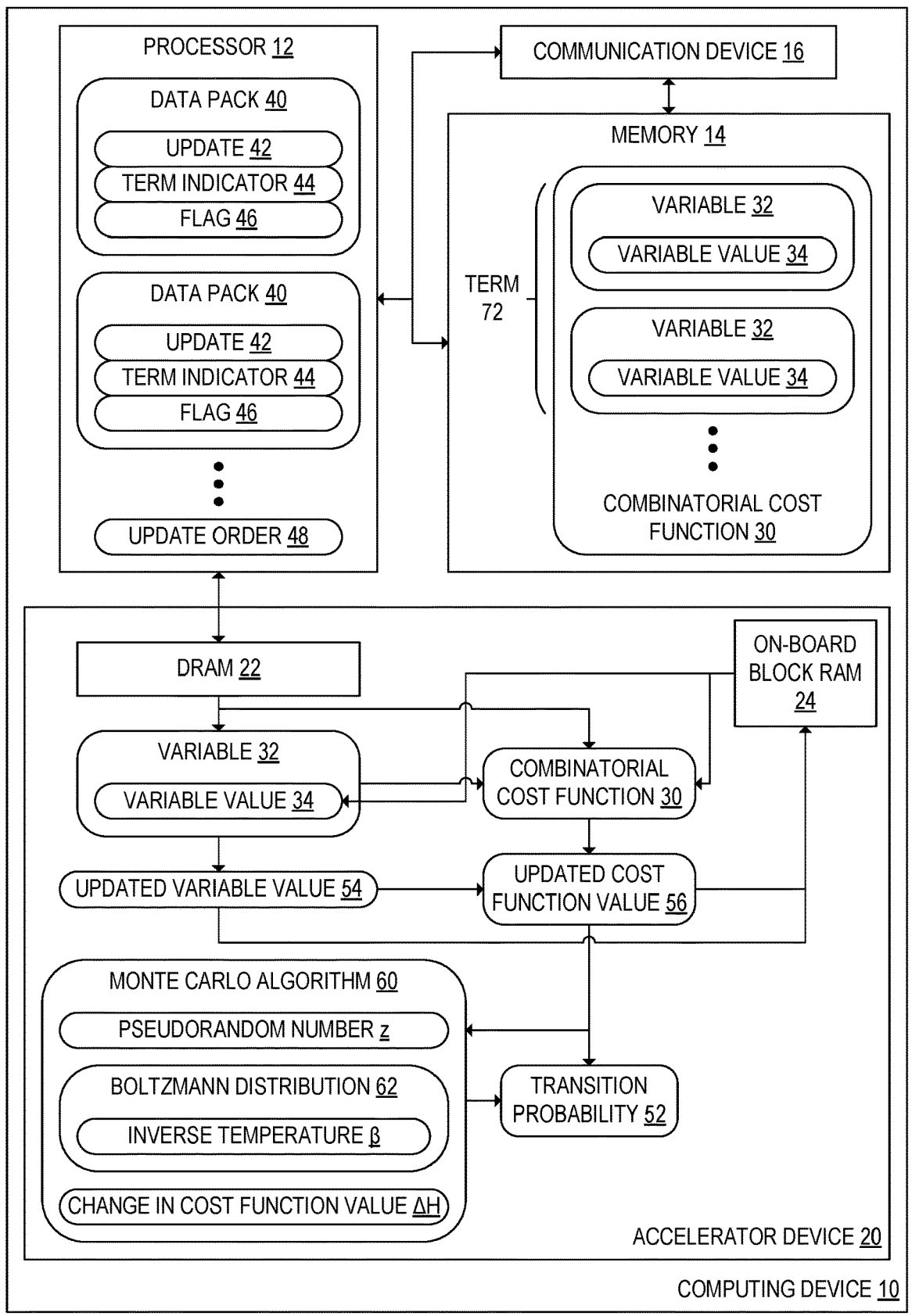
FIG. 1 shows an example computing device including a processor, memory, and an accelerator device, according to one embodiment of the present disclosure.

In order to address the inefficiency of existing systems and methods for computing combinatorial cost functions, as discussed above, the inventors have conceived of the following devices and methods. FIG. 1 shows a computing device 10 according to one example embodiment. The computing device 10 may include a processor 12 and may further include memory 14. The memory 14 may store instructions to compute a combinatorial cost function 30 of a plurality of variables 32. For example, the instructions to compute the combinatorial cost function 30 may be included in an application program and may be executed by the processor 12.

The computing device 10 may further include an accelerator device 20, which is configured as a hardware device operatively coupled to the processor 12. The processor 12 and the accelerator device 20 may be coupled by an interconnect such as PCI Express, AMBA, or some other type of interconnect. The accelerator device 20 may be specialized for computing combinatorial cost functions 30. In some embodiments, the accelerator device 20 may be selected from the group consisting of a field programmable gate array (FPGA), an application-specific integrated circuit (ASIC), a graphical processing unit (GPU), and a tensor processing unit (TPU). However, the accelerator device 20 may be another type of device in other embodiments. In embodiments in which the accelerator device 20 is an FPGA, the accelerator device 20 may include dynamic random-access memory (DRAM) 22 in which data may be stored when evaluating a combinatorial cost function 30, as discussed in further detail below. In some embodiments, the computing device 10 may further include on-board block RAM 24. It will be appreciated that block RAM is often used in FPGA type accelerator devices. In other implementations, other forms of static RAM maybe used instead of block RAM.

While the computing device 10 is shown in FIG. 1 as a single hardware device, the components of the computing device 10 may be distributed over a plurality of communicatively coupled computing devices in some embodiments. In such embodiments, the computing device 10 may include one or more communication devices 16. In one example, the plurality of communicatively coupled computing devices may include a server computing device and a client computing device that communicate over a network.

The combinatorial cost function 30 evaluated at the computing device 10 may have the form H=f($x_1, \ldots, x_k$). The variables $x_i$ may be either discrete or continuous variables. In some examples, the combinatorial cost function 30 may be expressed as a sum of a plurality of terms 72. In one example, the combinatorial cost function 30 may have the following form:

$$H = \sum_k T_k(x_{k_1} \cdot x_{k_2} \cdot \ldots \cdot x_{k_n})$$

In this example, · is an arbitrary binary operation between discrete or continuous variables $x_i$. $T_i$ are real-valued scalar weights applied to the terms 72. In other embodiments, the combinatorial cost function 30 may include one or more terms 72 that include operations applied over some other number of inputs. Each term 72 has an order n equal to the number of variables appearing in it.

The processor 12 may be configured to generate a plurality of data packs 40. Each data pack 40 may indicate an update to a variable 32 of the one or more variables 32 included in the combinatorial cost function 30. The update 42 may set the variable 32 to a new variable value 34. When the combinatorial cost function 30 includes a plurality of terms 72, the data pack 40 may further include one or more term indicators 44 that indicate one or more terms 72 of the combinatorial cost function 30 in which the variable 32 indicated in the data pack 40 occurs. In some embodiments, the data pack 40 may further include a flag 46 that affects the processing order of the plurality of data packs 40, as discussed in further detail below.

The processor 12 may be further configured to transmit the plurality of data packs 40 to the accelerator device 20. In some embodiments, the processor 12 may determine an update order 48 for the plurality of data packs 40 and may transmit the plurality of data packs 40 to the accelerator device 20 in the update order 48. The determination of the update order 48 is discussed in further detail below with reference to FIGS. 3-5.

In embodiments in which the accelerator device 20 is an FPGA that includes DRAM 22, the plurality of data packs 40 may be written to the DRAM 22. The data packs 40 may be written to the DRAM 22 in the update order 48 specified by the processor 12. For each data pack 40, the accelerator device 20 may be further configured to retrieve a variable value 34 of the variable 32 indicated by the data pack 40. The variable value 34 may be retrieved from the DRAM 22. In addition, the accelerator device 20 may be further configured to retrieve one or more other variable values 34 of one or more other variables 32. The one or more other variables 32 may be other variables 32 that occur in one or more terms 72 in which the variable 32 indicated in the data pack 40 occurs.

Alternatively to retrieving the variable value 34 from the DRAM 22, the accelerator device 20 may instead be configured to retrieve one or more memory addresses of the variable value 34 from the DRAM 22. In such embodiments, the accelerator device 20 may then retrieve the variable value 34 and/or the value of the combinatorial cost function 30 from the on-board block RAM 24 by accessing their respective memory addresses as indicated in the DRAM 22.

For each data pack 40, the accelerator device 20 may be further configured to generate an updated variable value 54 of the variable 32 as indicated by the data pack 40. For example, in some embodiments, the update 42 included in each data pack 40 may indicate a perturbation to add to the variable value 34. The accelerator device 20 may then input the updated variable value 54 into the one or more terms 72 of the combinatorial cost function 30 in which the variable 32 occurs. Thus, the accelerator device 20 may generate an updated cost function value 56 of the combinatorial cost function 30 based on the updated variable value 54.

For each data pack 40, the accelerator device 20 may be further configured to determine a transition probability 52 using a transition probability algorithm such as a Monte Carlo algorithm 60, as discussed in further detail below. The transition probability 52 is a probability that the updated variable value 54 is saved to be used in further iterations of determining the updated cost function value 56, or, if the data pack 40 is the last data pack 40 in the update order 48, included in the combinatorial cost function 30 when the accelerator device 20 outputs a final updated cost function value. For each data pack 40, when the updated variable value 54, the transition probability 52, and the updated cost function value 56 have been determined, the accelerator device 20 may be further configured to store the updated variable value 54 and the updated cost function value 56 with the transition probability 52. When the updated variable value 54 and the updated cost function value 56 are stored, the updated variable value 54 and the updated cost function value 56 may be stored in the DRAM 22 of the accelerator device 20. Alternatively, the updated variable value 54 and the updated cost function value 56 may be stored in the on-board block RAM 24. When the updated variable value 54 and the updated cost function value 56 are not stored, the variable 32 and the combinatorial cost function 30 may keep their previous values.

After the accelerator device 20 processes the last data pack 40 of the plurality of data packs 40, the accelerator device 20 may be further configured to output a final updated cost function value of the combinatorial cost function 130 to the processor 12. The final updated cost function value may be the updated cost function value 56 obtained when the last data pack 40 is processed. The accelerator device 20 may also output to the processor 12 a respective final variable value for one or more of the variables 32 included in the combinatorial cost function 30.

The Monte Carlo algorithm 60 is now described in further detail with reference to the example embodiments provided below. The Monte Carlo algorithm 60 may be a Markov chain Monte Carlo algorithm in which the transition probability 52 is determined based on the updated cost function value 56 and is independent of previous values of the combinatorial cost function 30. For example, the Monte Carlo algorithm 60 may be selected from the group consisting of simulated annealing, parallel tempering, and simulated quantum annealing.

Figure 2:
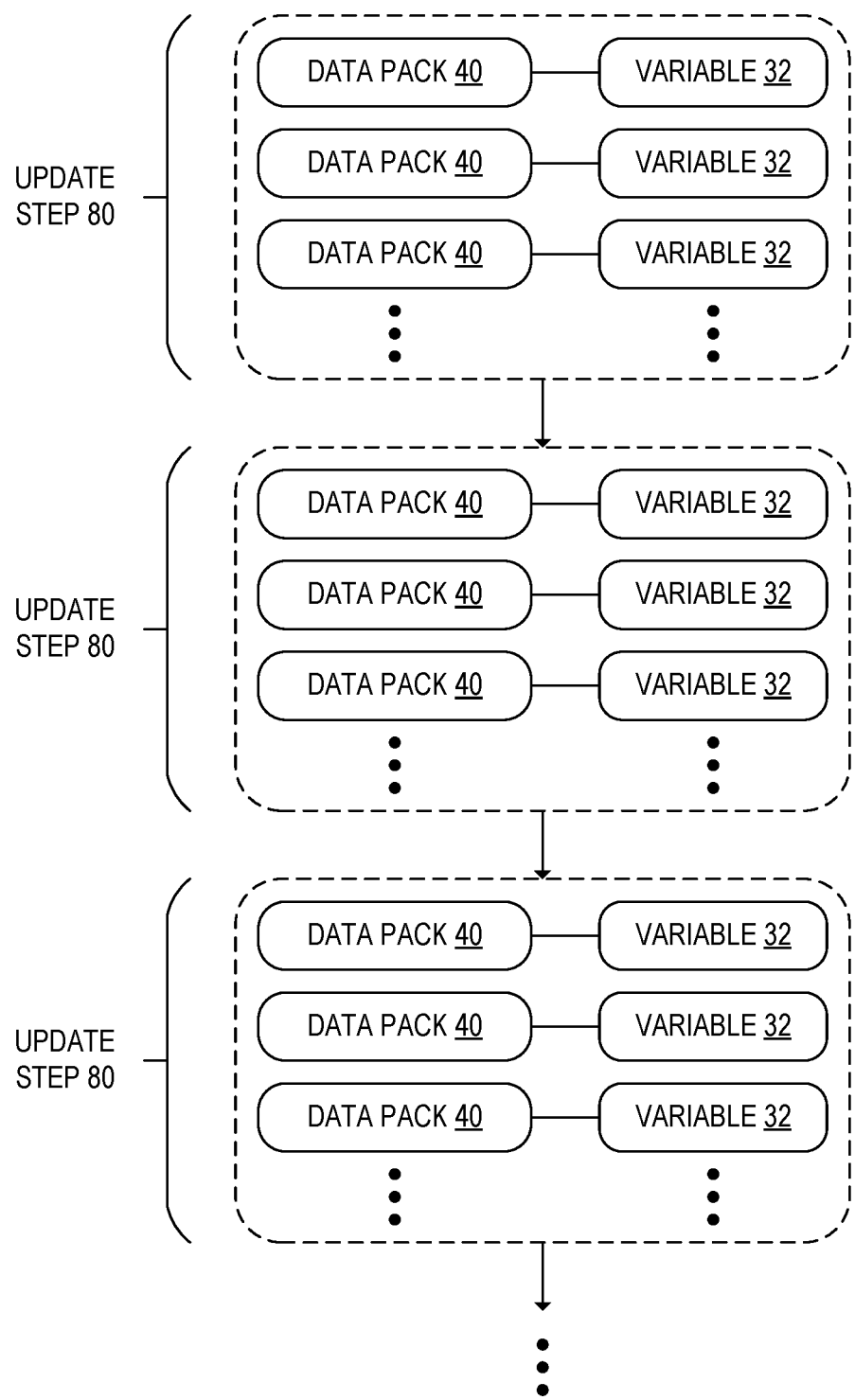
FIG. 2 shows an example plurality of update steps, according to the embodiment of FIG. 1.

The processor 12 may be configured to generate the plurality of data packs 40 for an update step 80 in which a respective data pack 40 is generated for each variable 32 of the plurality of variables 32 included in the combinatorial cost function 30, as shown in the example of FIG. 2. The processor 12 may generate sets of data packs 40 for a plurality of update steps 80 over which the value of the combinatorial cost function 30 may converge toward a global maximum or minimum. The update step 80 may be a Monte Carlo sweep, for example.

When the accelerator device 20 performs the Monte Carlo algorithm 60, the accelerator device 20 may, for each data pack 40 of the plurality of data packs 40, generate a pseudorandom number z. In one example embodiment, the pseudorandom number z may be generated from a uniform probability distribution with a range from 0 to 1. The accelerator device 20 may be further configured to determine the transition probability 52 based at least in part on the updated cost function value 56. For example, the transition probability 52 may be based at least in part on a change in the cost function value ΔH from the previous value of the combinatorial cost function 30 to the updated cost function value 56.

The accelerator device 20 may be further configured to store the updated cost function value 56 and the updated variable value 54 for the variable 32 indicated in the data pack 40 in response to determining that the transition probability 52 exceeds the pseudorandom number z. In some embodiments, rather than comparing the transition probability 52 and the pseudorandom number z directly, the accelerator device 20 may compare a logarithm of the transition probability 52 to a logarithm of the pseudorandom number z. This may save steps of computation in embodiments in which the transition probability is given at least in part by an exponential function, as in some examples discussed below.

In some example embodiments, the accelerator device 20 may be configured to determine the transition probability 52 based at least in part on a Boltzmann distribution 62 with an inverse temperature β. The Boltzmann distribution 62 is used in such embodiments to simulate thermal fluctuations in a system that allow the system to escape local optima that are not global optima. Thus, over a large number of update steps 80, the combinatorial cost function 30 may tend toward thermodynamic equilibrium at its global maximum or minimum.

In one example, the Monte Carlo algorithm 60 may be simulated annealing. When simulated annealing is used, the processor 12 may initialized each of the plurality of data packs 40 with an initial value for the inverse temperature β. The initial value of the inverse temperature β may be a minimum value that is incremented after each update step 80. Thus, as the Monte Carlo algorithm 60 progresses, the search for optima of the combinatorial cost function 30 may move away from the β=0 limit, corresponding to random assignment, and toward the β=∞ limit, corresponding to greedy search. This allows the accelerator 20 to iterate a process of first identifying a candidate region of parameter space in which a global maximum or minimum may occur and then searching for the global maximum or minimum within the candidate region in further detail.

In another example, the Monte Carlo algorithm 60 may be parallel tempering. When parallel tempering is used, the processor 12 may initialize a plurality of sets of variable values 34, each set of values having a corresponding initial value of the inverse temperature β. The initial values of the variables 32 and the inverse temperature β may be pseudorandom. After each update step 80, each data pack 40 may swap values of β with a previous or subsequent data pack 40 with the following probability:

$$P = \min(\exp(\Delta\beta\Delta H), 1)$$

where Δβ denotes the difference in values of β between the adjacent data packs 40. This allows for sets of variable values 34 at high temperatures (low values of β) to be set to low temperatures (high values of β) when the change in cost function value ΔH is large compared to the change in the inverse temperature Δβ. Thus, the parameter space of the combinatorial cost function 30 may be traversed more quickly due to faster "cooling" of sets of variable values 34 around which the rate of change in the updated cost function value 56 is higher.

In another example, the Monte Carlo algorithm 60 may be simulated quantum annealing. When simulated quantum annealing is used, the processor 12 may initialize a plurality of configurations of variable values 34 with a fixed value of the inverse temperature β. The accelerator device 20 may update the value of the combinatorial cost function 30 during each update step 80 according to the following rule:

$$H \to AH + B\sum_i \sum_n x_{i,n} XOR x_{i,n+1}$$

where A and B are tuning parameters that are varied according to a predefined schedule over the execution of the Monte Carlo algorithm 60, and the sum over n is a sum over a plurality of copies of the combinatorial cost function 30. The simulated quantum annealing algorithm is analogous to a discrete time Path Integral Monte Carlo simulation of a transverse field Ising model.

Additionally or alternatively to the example Monte Carlo algorithms 60 described above, one or more other algorithms could be used. Other example algorithms include Population Annealing Monte Carlo, combination with cluster updates, and steepest descent algorithms. In some embodiments, a combination of two or more of the above example algorithms could be used. Additionally or alternatively to Monte Carlo algorithms, other Markov-chain-based heuristics may be used to update the variable value 34.

In embodiments in which the processor 12 determines an update order 48 for the plurality of data packs 40, the processor 12 may pipeline the data packs 40 to account for dependencies in the terms 72 of the combinatorial cost function 30. FIGS. 3A-B show two example flags 46 that may be included in a data pack 40 and how those flags 46 affect the evaluation of the combinatorial cost function 30 across a plurality of update cycles 50 of the accelerator device 20. In the example of FIG. 3A, a data pack 40 includes an Accumulate flag 46A. The Accumulate flag 46A specifies that one or more subsequent data packs 40 are included in the same update 42 as the current data pack 40. The Accumulate flag 46A indicates that the term 72 of the combinatorial cost function 30 updated by the data pack 40 also depends upon one or more other variables 32 included in one or more other terms 72 in addition to the variable 32 updated by the data pack 40. The one or more other variables 32 may instead be included in one or more subsequent data packs 40. Thus, evaluation of a term 72 that includes a plurality of variables 32 may occur across a plurality of update cycles 50 of the accelerator device 20. In some embodiments, the Accumulate flag 46A may indicate a number of subsequent data packs 40 after which to wait to evaluate the combinatorial cost function 30.

In the example of FIG. 3B, the data pack 40 includes an Order_Extend flag 46B in addition to the Accumulate flag 46B. The Order_Extend flag 46B may be used when updating a term 72 that depends upon a plurality of variables 32. The Order_Extend flag 46B denotes that the subsequent data pack 40 includes an update to a variable 32 that is included in the same term 72 of the combinatorial cost function 30. Thus, the subsequent data pack 40 includes an update continuation 43 and allows a term 72 that includes multiple variables to be evaluated across a plurality of update cycles 50.

Figure 4:
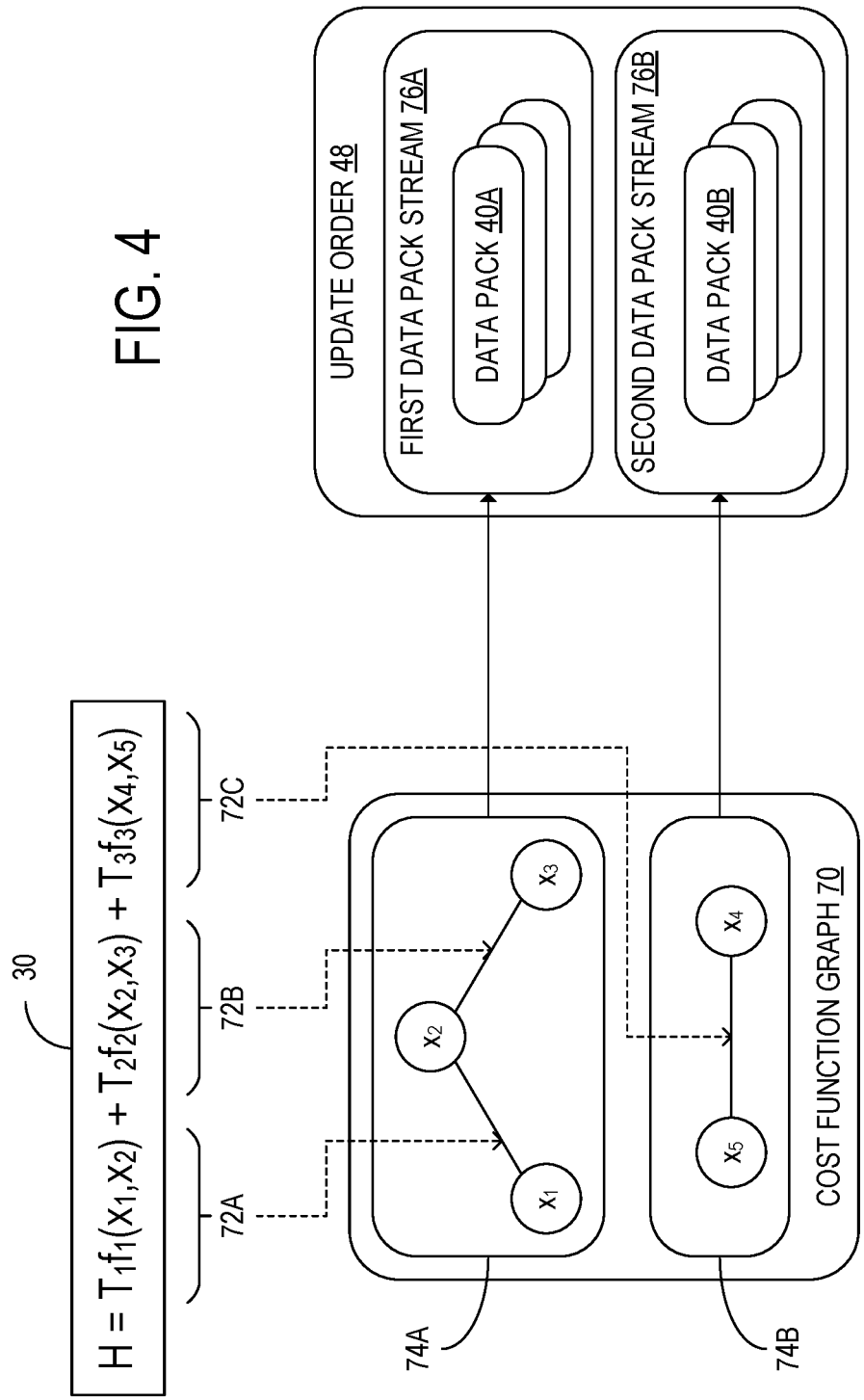
FIGS. 4 and 5 show examples of determining an update order for a plurality of data packs, according to the embodiment of FIG. 1.

FIG. 4 shows an example in which the update order 48 is set to avoid dependencies between terms 72 that may bottleneck evaluation of the updated cost function value 56. In the example of FIG. 4, the processor 12 may be configured to identify at least a first set 74A of one or more terms 72 and a second set 74B of one or more terms 72 included in the combinatorial cost function 30. In this example the first set 74A includes a first term 72A and a second term 72B, and the second set 74B includes a third term 72C. The processor 12 divides the terms 72 into the first set 74A and the second set 74B such that the first set 74A of one or more terms 72 and the second set 74B of one or more terms 72 respectively include non-overlapping sets of variables 32. In the example of FIG. 4, the first set 74A of one or more terms 72 includes the variables $x_1$, $x_2$, and $x_3$, and the second set 74B of one or more terms 72 includes the variables $x_4$ and $x_5$. Although two such sets of terms 72 are shown in FIG. 4, the combinatorial cost function 30 may include three or more such sets in other examples.

The combinatorial cost function 30 may be represented by a cost function graph 70 in which nodes represent variables 32 and edges represent the inclusion of two variables 32 in a term 72. The cost function graph 70 may indicate, for each variable 32, any variables 32 upon which the update 42 to that variable 32 depends. The cost function graph 70 may further indicate one or more terms 72 including such variables 32. Alternatively, the combinatorial cost function 30 may be represented as a hypergraph in which nodes represent variables 32 and each edge represents a term 72. As shown in FIG. 4, since the combinatorial cost function 30 includes a first set 74A of one or more terms 72 and a second set 74B of one or more terms 72 that respectively include non-overlapping sets of variables 32, the cost function graph 70 is disconnected. In some embodiments, the processor 12 may use depth-first or breadth-first search to determine that the cost function graph 70 is disconnected.

The processor 12 may then set the update order 48 to include a first data pack stream 76A in which the one or more terms 72 of the first set 74A are configured to be updated and a second data pack stream 76B in which the one or more terms 72 of the second set 74B are configured to be updated. The first data pack stream 76A, as shown in FIG. 4, includes a first plurality of data packs 40A, and the second data pack stream 76B includes a second plurality of data packs 40B. The first plurality of data packs 40A includes updates to the variables $x_1$, $x_2$, and $x_3$, and the second plurality of data packs 40B includes updates to the variables $x_4$ and $x_5$. Thus, independent terms of the combinatorial cost function 30 may be evaluated in parallel; for each data pack 40, evaluation of the updated cost function value 56 is not delayed by redundant evaluation of terms left unchanged by the update 42 included in that data pack 40. This may result in improved performance.

Figure 5:
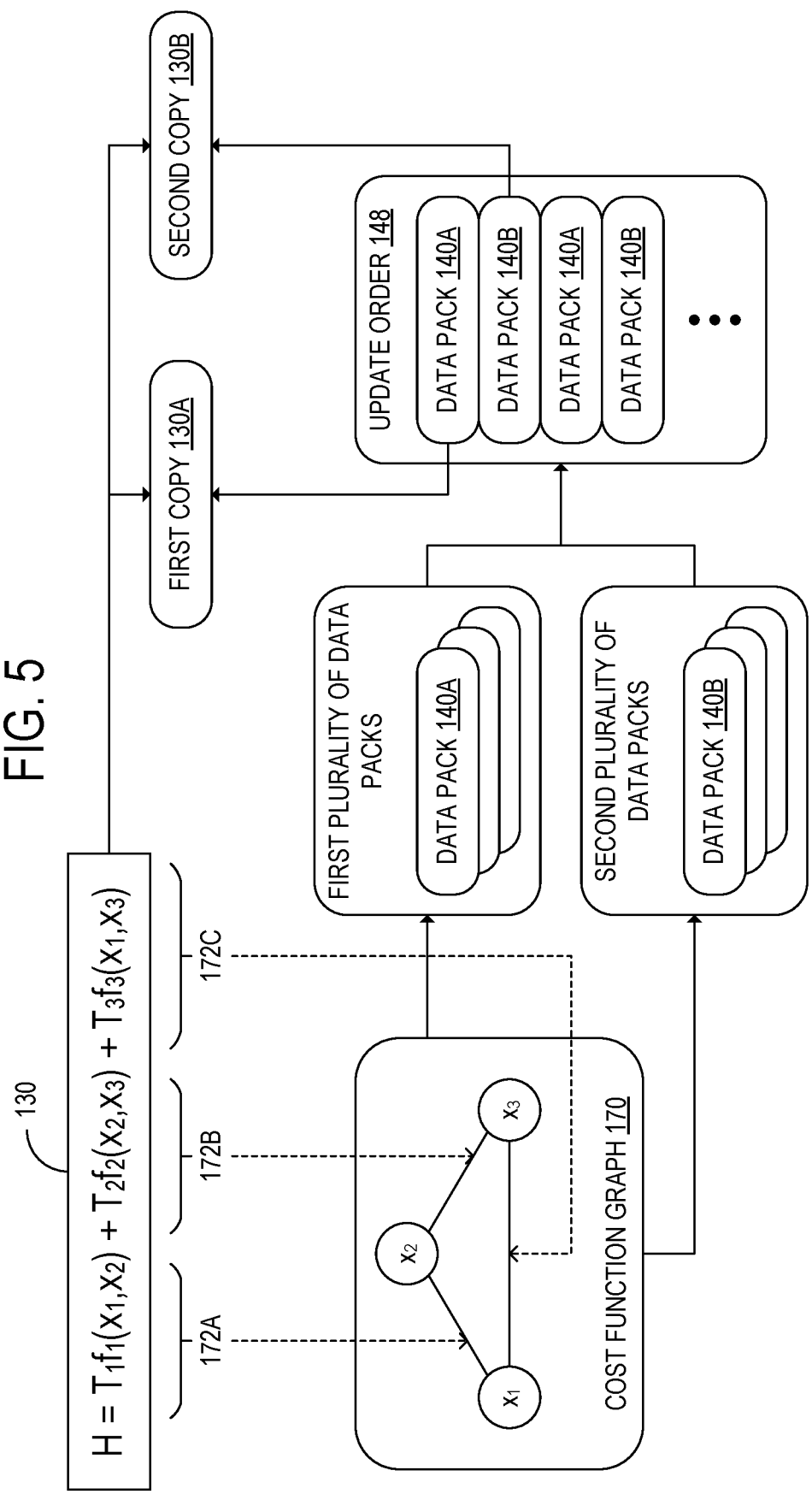

FIG. 5 shows another example in which the processor 12 determines an update order 148 for a combinatorial cost function 130. In the example of FIG. 5, the combinatorial cost function 130 includes a first term 172A, a second term 172B, and a third term 172C. However, as seen from the connected cost function graph 170 representing the combinatorial cost function 130, the combinatorial cost function 130 does not include two or more independent sets of terms 72. In the example of FIG. 5, two variables 32 are independent if those variables 32 are not connected by an edge in the cost function graph 170. Since each of the variables $x_1$, $x_2$, and $x_3$ shown in FIG. 5 is connected to each of the others, none of the variables $x_1$, $x_2$, and $x_3$ are independent. Thus, in the example of FIG. 5, the processor 12 may be configured to determine that each term 72 of the combinatorial cost function 130 includes one or more variables 32 that are included in at least one other term 72. For example, the processor 12 may use depth-first or breadth-first search to determine whether the cost function graph 170 is connected.

The processor 12 may be further configured to set the update order 148 to include a first plurality of data packs 140A configured to update a first copy 130A of the combinatorial cost function 130 and a second plurality of data packs 140B configured to update a second copy 130B of the combinatorial cost function 130. By generating a first copy 130A and a second copy 130B of the combinatorial cost function 130 and updating them separately, the processor 12 may treat the combinatorial cost function as though it were divided into two independent sets of terms 72 as in the example of FIG. 4. In order to avoid bottlenecks in the processing pipeline of the accelerator device 20, the first plurality of data packs 140A and the second plurality of data packs 140B may be interspersed in the update order 148. For example, as shown in FIG. 5, the update order 148 may alternate between data packs 140A and 140B from the first plurality of data packs 140A and the second plurality of data packs 140B respectively.

In some embodiments, the processor 12 may generate three or more copies of the combinatorial cost function 130. In such embodiments, the processor 12 may generate a respective plurality of data packs for each copy and may intersperse data packs from each plurality of data packs in the update order 148.

Figure 6A:
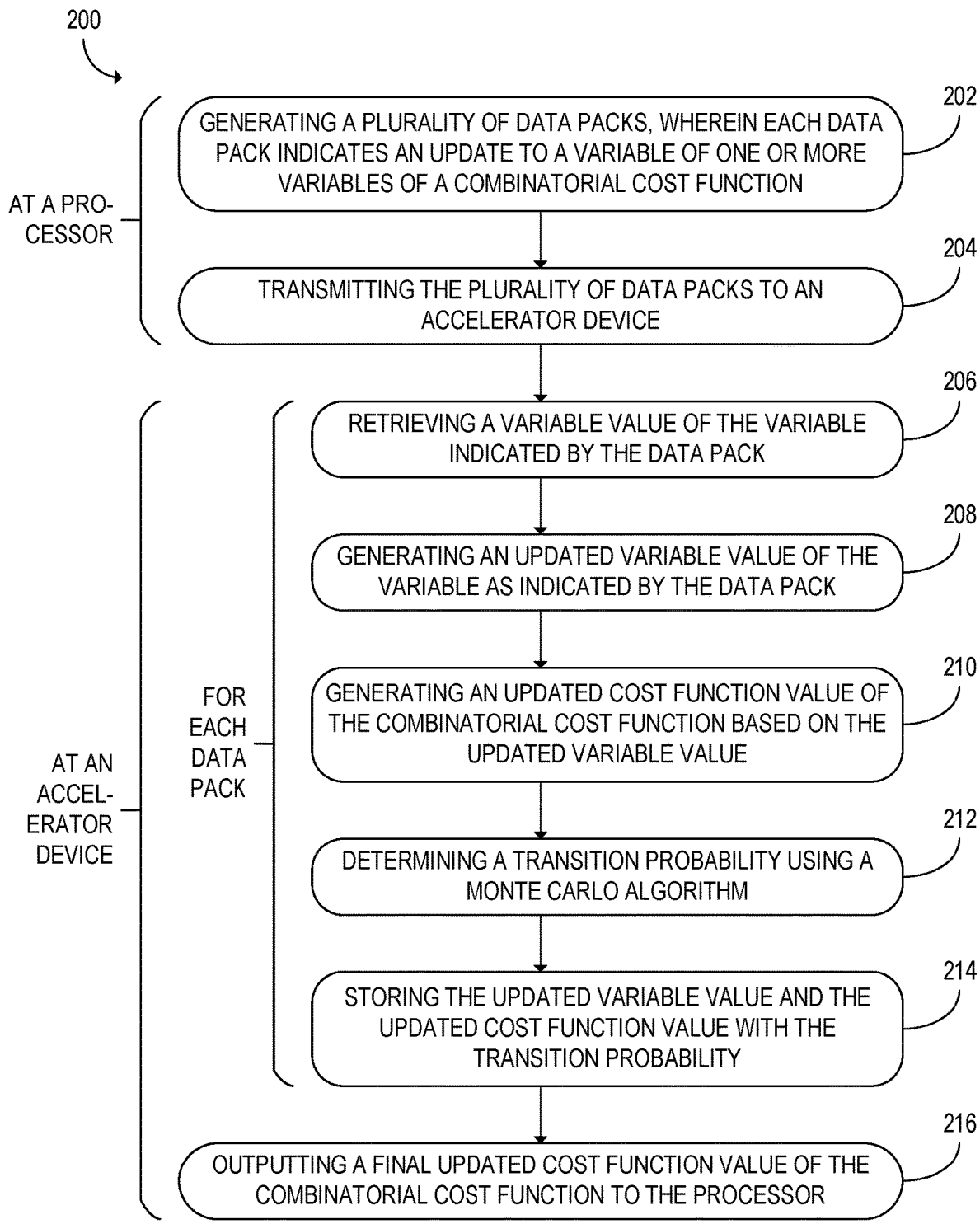
FIG. 6A shows a flowchart of method that may be performed by a computing device, according to the embodiment of FIG. 1.

FIG. 6A shows a flowchart of a method 200 that may be used with a computing device to approximate a maximum and/or minimum of a combinatorial cost function. The computing device may be the computing device 10 of FIG. 1 or may alternatively be some other computing device. At step 202, the method 200 may include generating a plurality of data packs. Each data pack may indicate an update to a variable of one or more variables of the combinatorial cost function. In some embodiments, each data pack may indicate one or more terms of the combinatorial cost function in which the variable indicated in the data pack occurs. Additionally or alternatively, the plurality of data packs may be generated for an update step in which a respective data pack is generated for each variable of the plurality of variables. At step 204, the method 200 may further include transmitting the plurality of data packs to an accelerator device. Steps 202 and 204 may occur at a processor of the computing device. Additionally or alternatively, the accelerator device may be included in the computing device. In some embodiments, when the accelerator device is an FPGA, the accelerator device may include DRAM. In such embodiments, the plurality of data packs may be written to the DRAM.

The following steps of the method 200 may be performed at the accelerator device. At step 206, the method 200 may further include, for each data pack, retrieving a variable value of the variable indicated by the data pack. In embodiments in which the accelerator device includes DRAM, the variable value may be retrieved from the DRAM for each data pack. Alternatively, in some embodiments, respective memory addresses of the combinatorial cost function and plurality of variables may be retrieved from the DRAM and the variable values may be retrieved from the on-board block RAM. At step 208, the method 200 may further include, for each data pack, generating an updated variable value of the variable as indicated by the data pack. For each data pack, the method 200 may further include, at step 210, generating an updated cost function value of the combinatorial cost function based on the updated variable value. Thus, the updated variable value may be plugged into the combinatorial cost function and the combinatorial cost function may be evaluated.

At step 212, the method 200 may further include, for each data pack, determining a transition probability using a Monte Carlo algorithm. For example, the Monte Carlo algorithm may be selected from the group consisting of simulated annealing, parallel tempering, and simulated quantum annealing. In some embodiments, the transition probability is based at least in part on a change in cost function value, relative to a previous value of the cost function, that occurs when the updated cost function value is determined based on the updated variable value. Additionally or alternatively, the transition probability may be determined based at least in part on a Boltzmann distribution.

At step 214, the method 200 may further include storing the updated variable value and the updated cost function value with the transition probability. In embodiments in which the accelerator device includes DRAM, the updated variable value and the updated cost function value may be stored in the DRAM with the transition probability. Alternatively, the updated variable value may be stored in on-chip block RAM for enhanced computational speed. In embodiments in which the variable value and the cost function value are stored in on-board block RAM, the updated variable values and updated cost function values may be written to the on-board block RAM. When the updated variable value and the updated cost function value are stored, they may respectively replace previous values of the variable and the combinatorial cost function and may be used when processing one or more subsequent data packs. After the last data pack of the plurality of data packs is processed at the accelerator device, the method 200 may further include, at step 216, outputting a final updated cost function value of the combinatorial cost function to the processor. A respective final variable value for one or more of the variables included in the combinatorial cost function may also be output to the processor.

Figure 6B:
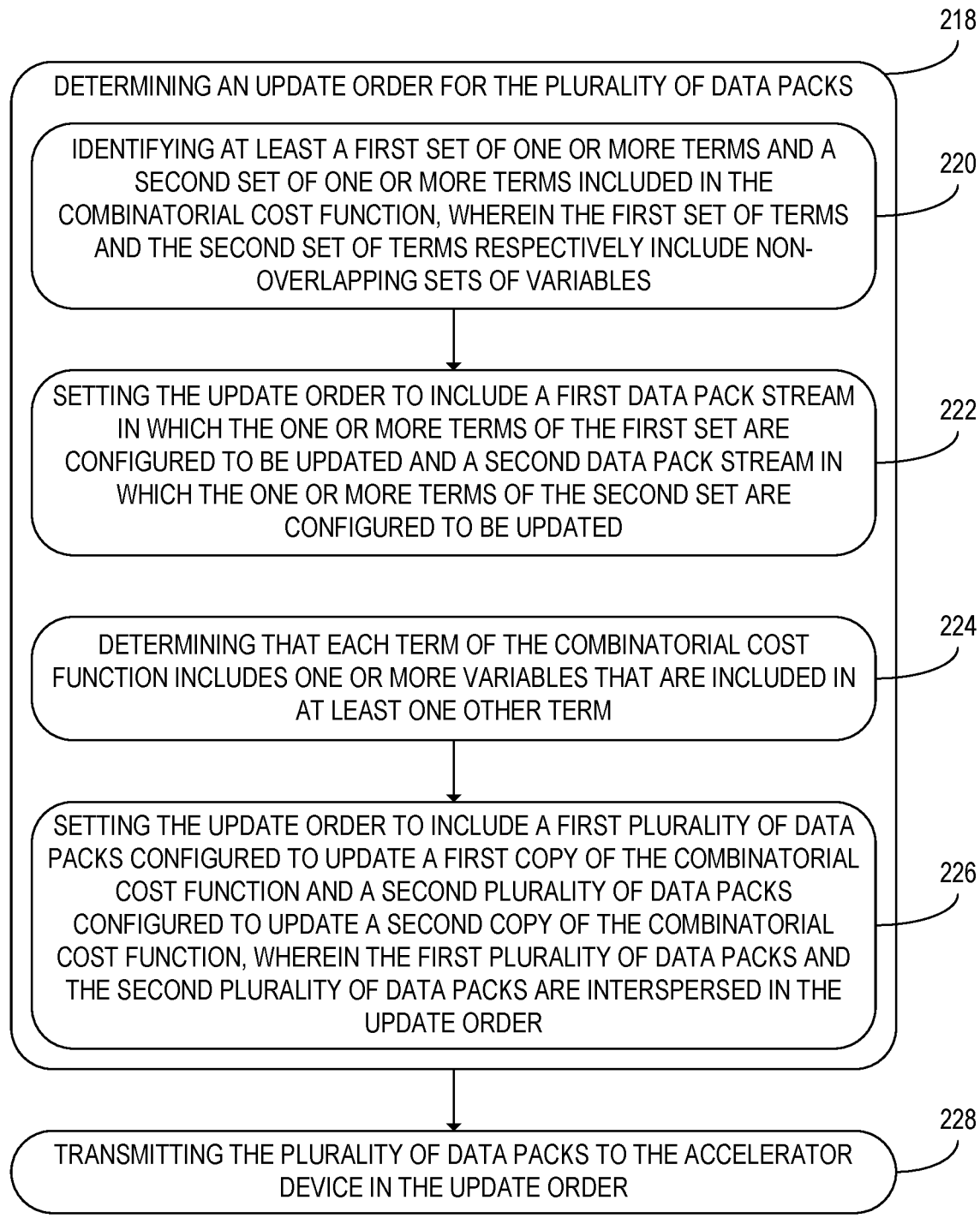
FIGS. 6B and 6C show additional steps of the method of FIG. 6A that may be performed in some embodiments.

FIG. 6B shows additional steps of the method 200 that may be performed in some embodiments. At step 218, the method 200 may include determining an update order for the plurality of data packs. In some instances, determining the update order for the plurality of data packs may include, at step 220, identifying at least a first set of one or more terms and a second set of one or more terms included in the combinatorial cost function, wherein the first set of one or more terms and the second set of one or more terms respectively include non-overlapping sets of variables. For example, step 220 may include performing an algorithm for determining graph connectivity on a representation of the combinatorial cost function as a cost function graph. In the cost function graph, each node may represent a variable. The cost function graph may have edges between each pair of nodes representing variables that occur together in at least one term. In embodiments in which step 220 is performed, step 218 may further include, at step 222, setting the update order to include a first data pack stream in which the one or more terms of the first set are configured to be updated and a second data pack stream in which the one or more terms of the second set are configured to be updated. Thus, independent terms of the combinatorial cost function may be evaluated in parallel, which may improve evaluation speed.

In some instances, step 218 may include, at step 224, determining that each term of the combinatorial cost function includes one or more variables that are included in at least one other term. In such instances, the combinatorial cost function is not separable into two or more sets of independent terms as in steps 220 and 222. When step 224 is performed, step 218 may further include setting the update order to include a first plurality of data packs configured to update a first copy of the combinatorial cost function and a second plurality of data packs configured to update a second copy of the combinatorial cost function. the first plurality of data packs and the second plurality of data packs may be interspersed in the update order, for example, by alternating between data packs from the first plurality of data packs and the second plurality of data packs.

In embodiments in which step 218 is performed, the method 200 may further include, at step 228, transmitting the plurality of data packs to the accelerator device in the update order.

Figure 6C:
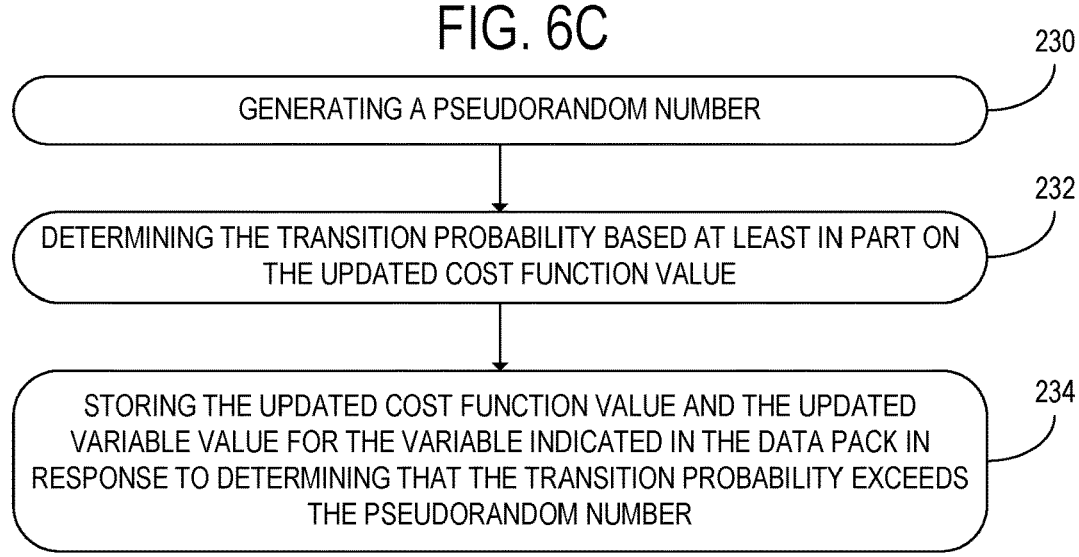

FIG. 6C shows additional steps of the method 200 that may be performed in some embodiments. The steps of FIG. 6C may be performed for each data pack of the plurality of data packs. At step 230, the method 200 may include generating a pseudorandom number. The pseudorandom number may be generated, in some embodiments, from a uniform probability distribution over an interval from 0 to 1. The method may further include, at step 232, determining the transition probability based at least in part on the updated cost function value. For example, when parallel tempering is used as the Monte Carlo algorithm, the transition probability is determined using a change in cost function value between iterations. At step 234, the method 200 may further include storing the updated cost function value and the updated variable value for the variable indicated in the data pack in response to determining that the transition probability exceeds the pseudorandom number. In some embodiments, determining that the transition probability exceeds the pseudorandom number may include comparing a logarithm of the transition probability to a logarithm of the pseudorandom number rather than comparing the transition probability and the pseudorandom number directly.

Using the example computing devices and methods described herein, the efficiency of combinatorial cost function maximization and minimization may be improved. In tests performed by the inventors, speedups of 100 to 1000 times have been achieved using the devices and methods described above, in comparison to existing systems and methods for combinatorial cost function optimization. Since combinatorial cost function optimization problems occur in a wide variety of applications, the devices and methods described herein may allow problems in many fields to be solved with greater computational efficiency.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
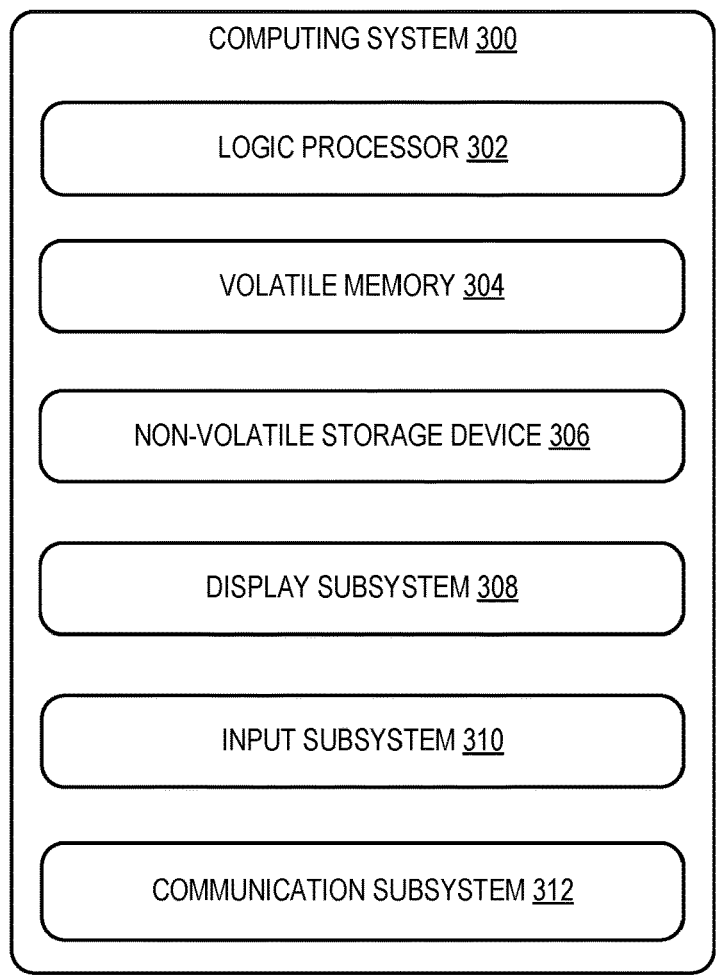
FIG. 7 shows a schematic view of an example computing environment in which the computer device of FIG. 1 may be enacted.

FIG. 7 schematically shows a non-limiting embodiment of a computing system 300 that can enact one or more of the methods and processes described above. Computing system 300 is shown in simplified form. Computing system 300 may embody the computing device 10 described above and illustrated in FIG. 1. Computing system 300 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 300 includes a logic processor 302 volatile memory 304, and a non-volatile storage device 306. Computing system 300 may optionally include a display subsystem 308, input subsystem 310, communication subsystem 312, and/or other components not shown in FIG. 7.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 300 to send and/or receive messages to and/or from other devices via a network such as the Internet.

According to one aspect of the present disclosure, a computing device is provided, including memory storing instructions to compute a combinatorial cost function of a plurality of variables. The computing device may further comprise an accelerator device and a processor. The processor may be configured to generate a plurality of data packs, wherein each data pack indicates an update to a variable of the one or more variables, and transmit the plurality of data packs to the accelerator device. The accelerator device may be configured to, for each data pack, retrieve a variable value of the variable indicated by the data pack. The accelerator device may be further configured to generate an updated variable value of the variable as indicated by the data pack and generate an updated cost function value of the combinatorial cost function based on the updated variable value. The accelerator device may be further configured to determine a transition probability using a Monte Carlo algorithm and store the updated variable value and the updated cost function value with the transition probability. The accelerator device may be further configured to output a final updated cost function value of the combinatorial cost function to the processor.

According to this aspect, the processor may be further configured to determine an update order for the plurality of data packs. The processor may be further configured to transmit the plurality of data packs to the accelerator device in the update order.

According to this aspect, each data pack may indicate one or more terms of the combinatorial cost function in which the variable indicated in the data pack occurs.

According to this aspect, the processor may be further configured to identify at least a first set of one or more terms and a second set of one or more terms included in the combinatorial cost function, wherein the first set of one or more terms and the second set of one or more terms respectively include non-overlapping sets of variables. The processor may be further configured to set the update order to include a first data pack stream in which the one or more terms of the first set are configured to be updated and a second data pack stream in which the one or more terms of the second set are configured to be updated.

According to this aspect, the processor may be further configured to determine that each term of the combinatorial cost function includes one or more variables that are included in at least one other term. The processor may be further configured to set the update order to include a first plurality of data packs configured to update a first copy of the combinatorial cost function and a second plurality of data packs configured to update a second copy of the combinatorial cost function, wherein the first plurality of data packs and the second plurality of data packs are interspersed in the update order.

According to this aspect, the processor may be further configured to generate the plurality of data packs for an update step in which a respective data pack is generated for each variable of the plurality of variables.

According to this aspect, the computing device may further include on-board block random access memory (RAM). The accelerator device may include dynamic random-access memory (DRAM). The plurality of data packs may be written to the DRAM. For each data pack, the variable value may be retrieved from the on-board block RAM. The updated variable value and the updated cost function value may be stored in the on-board block RAM with the transition probability.

According to this aspect, the accelerator device is further configured to, for each data pack, generate a pseudorandom number. The accelerator device may be further configured to determine the transition probability based at least in part on the updated cost function value. The accelerator device may be further configured to store the updated cost function value and the updated variable value for the variable indicated in the data pack in response to determining that the transition probability exceeds the pseudorandom number.

According to this aspect, the Monte Carlo algorithm may be selected from the group consisting of simulated annealing, parallel tempering, simulated quantum annealing, and population annealing Monte Carlo.

According to this aspect, the accelerator device may be configured to determine the transition probability based at least in part on a Boltzmann distribution.

According to this aspect, the accelerator device may be selected from the group consisting of a field programmable gate array (FPGA), an application-specific integrated circuit (ASIC), a graphical processing unit (GPU), and a tensor processing unit (TPU).

According to another aspect of the present disclosure, a method for use with a computing device is provided. The method may include, at a processor, generating a plurality of data packs, wherein each data pack indicates an update to a variable of one or more variables of a combinatorial cost function. The method may further include transmitting the plurality of data packs to an accelerator device. The method may further include, at the accelerator device, for each data pack, retrieving a variable value of the variable indicated by the data pack. The method may further include generating an updated variable value of the variable as indicated by the data pack. The method may further include generating an updated cost function value of the combinatorial cost function based on the updated variable value. The method may further include determining a transition probability using a Monte Carlo algorithm. The method may further include storing the updated variable value and the updated cost function value with the transition probability. The method may further include outputting a final updated cost function value of the combinatorial cost function to the processor.

According to this aspect, the method may further include, at the processor, determining an update order for the plurality of data packs. The method may further include transmitting the plurality of data packs to the accelerator device in the update order.

According to this aspect, each data pack may indicate one or more terms of the combinatorial cost function in which the variable indicated in the data pack occurs.

According to this aspect, the method may further include, at the processor, identifying at least a first set of one or more terms and a second set of one or more terms included in the combinatorial cost function, wherein the first set of one or more terms and the second set of one or more terms respectively include non-overlapping sets of variables. The method may further include setting the update order to include a first data pack stream in which the one or more terms of the first set are configured to be updated and a second data pack stream in which the one or more terms of the second set are configured to be updated.

According to this aspect, the method may further include, at the processor, determining that each term of the combinatorial cost function includes one or more variables that are included in at least one other term. The method may further include setting the update order to include a first plurality of data packs configured to update a first copy of the combinatorial cost function and a second plurality of data packs configured to update a second copy of the combinatorial cost function, wherein the first plurality of data packs and the second plurality of data packs are interspersed in the update order.

According to this aspect, the plurality of data packs may be generated for an update step in which a respective data pack is generated for each variable of the plurality of variables.

According to this aspect, the method may further include, for each data pack, generating a pseudorandom number. The method may further include determining the transition probability based at least in part on the updated cost function value. The method may further include storing the updated cost function value and the updated variable value for the variable indicated in the data pack in response to determining that the transition probability exceeds the pseudorandom number.

According to this aspect, the Monte Carlo algorithm may be selected from the group consisting of simulated annealing, parallel tempering, and simulated quantum annealing.

According to another aspect of the present disclosure, a computing device is provided, including memory storing instructions to compute a combinatorial cost function of a plurality of variables. The computing device may further include an accelerator device and a processor. The processor may be configured to, for each variable of the plurality of variables, generate a respective plurality of data packs, wherein each data pack indicates an update to a variable of the one or more variables. For each plurality of data packs, the processor may be further configured to determine a respective update order. The processor may be further configured to transmit each plurality of data packs to the accelerator device in the update order determined for that plurality of data packs. The accelerator device may be configured to, for each data pack, retrieve a variable value of the variable indicated by the data pack. The accelerator device may be further configured to generate an updated variable value of the variable as indicated by the data pack. The accelerator device may be further configured to generate an updated cost function value of the combinatorial cost function based on the updated variable value. The accelerator device may be further configured to determine a transition probability using a transition probability algorithm. The accelerator device may be further configured to store the updated variable value and the updated cost function value with the transition probability. The accelerator device may be further configured to output a final updated cost function value of the combinatorial cost function to the processor.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
  memory storing instructions to compute a combinatorial cost function of a plurality of variables;
  an accelerator device; and
  a processor configured to execute the instructions to:
    determine an update order for a plurality of data packs;
    generate the plurality of data packs, wherein:
      each data pack indicates an update to a variable of the one or more variables; and
      at least one data pack of the plurality of data packs includes an accumulate flag indicating that one or more subsequent data packs configured to be applied in a same cost function update as the at least one data pack, as specified in the update order; and
    transmit the plurality of data packs to the accelerator device in the update order;
  wherein the accelerator device is configured to:
    for each data pack of the plurality of data packs:
      retrieve a variable value of the variable indicated by the data pack; and
      based at least in part on the variable value, generate an updated variable value of the variable as indicated by the data pack;
    for each of the data packs not indicated as a subsequent data pack in the accumulate flag of a prior data pack:
      generate an updated cost function value of the combinatorial cost function based at least in part on the updated variable value;
      determine a transition probability based at least in part on the updated cost function value; and
      store the updated variable value and the updated cost function value with the transition probability; and
    output a final updated cost function value of the combinatorial cost function to the processor.

2. The computing device of claim 1, wherein:
  the combinatorial cost function includes a plurality of terms; and
  each data pack indicates one or more terms of the plurality of terms in which the variable indicated in the data pack occurs.

3. The computing device of claim 2, wherein:
  the accumulate flag indicates a term of the plurality of terms;
  the accumulate flag indicates a number of the one or more subsequent data packs; and
  the hardware accelerator is configured to delay updating the term indicated by the accumulate flag until after a number of update cycles equal to the number of the one or more subsequent data packs have elapsed.

4. The computing device of claim 2, wherein the at least one data pack further includes an order extend flag that indicates that an immediately subsequent data pack of the one or more subsequent data packs includes an update to a corresponding variable included in a same term as the variable indicated in the data pack.

5. The computing device of claim 2, wherein the processor is further configured to:
  identify a plurality of non-intersecting term subsets that each include one or more terms of the plurality of terms of the combinatorial cost function, wherein respective sets of the variables included in the one or more terms do not overlap between the plurality of non-intersecting term subsets; and
  transmit the plurality of data packs to the accelerator device in a plurality of parallel streams respectively associated with the non-intersecting term subsets.

6. The computing device of claim 5, wherein the processor is configured to identify the non-intersecting term subsets at least in part by:
  computing a cost function graph including a plurality of nodes that represent the variables and a plurality of edges that represent inclusion of respective connected variables in a shared term; and performing a breadth-first search or a depth-first search over the cost function graph.

7. The computing device of claim 1, further comprising on-board block random access memory (RAM), wherein:

the accelerator device includes dynamic random-access memory (DRAM);

the plurality of data packs are written to the DRAM;

for each data pack, the variable value is retrieved from the on-board block RAM; and the updated variable value and the updated cost function value are stored in the on-board block RAM with the transition probability.

8. The computing device of claim 1, wherein the accelerator device is configured to process a plurality of copies of the combinatorial cost function in parallel.

9. The computing device of claim 8, wherein respective data packs associated with the plurality of copies of the combinatorial cost function are interspersed in the update order.

10. The computing device of claim 1, wherein the accelerator device is configured to determine transition probability using a Monte Carlo algorithm selected from the group consisting of simulated annealing, parallel tempering, simulated quantum annealing, and population annealing Monte Carlo.

11. The computing device of claim 1, wherein the accelerator device is configured to determine the transition probability based at least in part on a Boltzmann distribution.

12. A method for use with a computing device, the method comprising:

at a processor:

determining an update order for a plurality of data packs;

generating a plurality of data packs based at least in part on a combinatorial cost function of a plurality of variables, wherein:

each data pack indicates an update to a variable of the one or more variables; and at least one data pack of the plurality of data packs includes an accumulate flag indicating that one or more subsequent data packs configured to be applied in a same cost function update as the at least one data pack, as specified in the update order; and transmit the plurality of data packs to an accelerator device in the update order; and at the accelerator device:

for each data pack of the plurality of data packs:

retrieving a variable value of the variable indicated by the data pack; and based at least in part on the variable value, generating an updated variable value of the variable as indicated by the data pack;

for each of the data packs not indicated as a subsequent data pack in the accumulate flag of a prior data pack:

generating an updated cost function value of the combinatorial cost function based at least in part on the updated variable value;

determining a transition probability based at least in part on the updated cost function value; and storing the updated variable value and the updated cost function value with the transition probability; and outputting a final updated cost function value of the combinatorial cost function to the processor.

13. The method of claim 12, wherein:

the combinatorial cost function includes a plurality of terms; and each data pack indicates one or more terms of the plurality of terms in which the variable indicated in the data pack occurs.

14. The method of claim 13, wherein:

the accumulate flag indicates a term of the plurality of terms;

the accumulate flag indicates a number of the one or more subsequent data packs; and the method further comprises, at the hardware accelerator, delaying updating the term indicated by the accumulate flag until after a number of update cycles equal to the number of the one or more subsequent data packs have elapsed.

15. The method of claim 13, wherein the at least one data pack further includes an order extend flag that indicates that an immediately subsequent data pack of the one or more subsequent data packs includes an update to a corresponding variable included in a same term as the variable indicated in the data pack.

16. The method of claim 13, further comprising, at the processor:

identifying a plurality of non-intersecting term subsets that each include one or more terms of the plurality of terms of the combinatorial cost function, wherein respective sets of the variables included in the one or more terms do not overlap between the plurality of non-intersecting term subsets; and transmitting the plurality of data packs to the accelerator device in a plurality of parallel streams respectively associated with the non-intersecting term subsets.

17. The method of claim 16, wherein identifying the non-intersecting term subsets includes:

computing a cost function graph including a plurality of nodes that represent the variables and a plurality of edges that represent inclusion of respective connected variables in a shared term; and performing a breadth-first search or a depth-first search over the cost function graph.

18. The method of claim 12, further comprising, at the accelerator device, processing a plurality of copies of the combinatorial cost function in parallel.

19. The method of claim 18, wherein respective data packs associated with the plurality of copies of the combinatorial cost function are interspersed in the update order.

20. A computing device comprising:

memory storing instructions to compute a combinatorial cost function of a plurality of variables, wherein the combinatorial cost function includes a plurality of terms;

an accelerator device; and a processor configured to execute the instructions to:

determine an update order for a plurality of data packs;

generate a plurality of data packs, wherein:

each data pack indicates an update to a variable of the one or more variables;

at least one data pack of the plurality of data packs includes an accumulate flag indicating that one or more subsequent data packs configured to be applied in a same cost function update as the at least one data pack, as specified in the update order;

each data pack indicates one or more terms of the plurality of terms in which the variable indicated in the data pack occurs; and the at least one data pack and the one or more subsequent data packs include respective updates to corresponding variables included in a shared term of the plurality of terms;

transmit the plurality of data packs to the accelerator device in the update order;

wherein the accelerator device is configured to:

for each data pack of the plurality of data packs:

retrieve a variable value of the variable indicated by the data pack; and based at least in part on the variable value, generate an updated variable value of the variable as indicated by the data pack;

for each of the data packs not indicated as a subsequent data pack in the accumulate flag of a prior data pack:

generate an updated cost function value of the combinatorial cost function based at least in part on the updated variable value;

determine a transition probability based at least in part on the updated cost function value; and store the updated variable value and the updated cost function value with the transition probability; and output a final updated cost function value of the combinatorial cost function to the processor.

* * * * *